United States Patent [19]

McCann

[11] 3,731,159

[45] May 1, 1973

[54] MICROWAVE DIODE WITH LOW CAPACITANCE PACKAGE

[75] Inventor: Joseph A. McCann, Auburn, N.Y.

[73] Assignee: Anheuser-Bush, Incorporated, St. Louis, Mo.

[22] Filed: May 19, 1971

[21] Appl. No.: 144,989

Related U.S. Application Data

[63] Continuation-in-part of Ser. No. 886,662, Dec. 19, 1969, abandoned.

[52] U.S. Cl.................317/234 R, 117/201, 117/212, 317/234 E, 317/234 F, 317/235 T, 317/235 AD, 317/235 AJ

[51] Int. Cl.............H01l 1/10, H01l 5/00, H01l 9/10

[58] Field of Search........................317/234 E, 234 F

[56] References Cited

UNITED STATES PATENTS

| | | | |
|---|---|---|---|
| 3,392,312 | 7/1968 | Carman | 317/234 |
| 3,432,919 | 3/1969 | Rosvold | 317/234 |
| 3,437,886 | 4/1969 | Edquist et al. | 317/234 |
| 3,441,422 | 4/1969 | Graff | 317/234 |
| 3,489,958 | 1/1970 | Gramberg et al. | 317/235 |
| 3,505,106 | 4/1970 | Pliskin et al. | 317/234 |

*Primary Examiner*—John W. Huckert
*Assistant Examiner*—William D. Larkin
*Attorney*—Carl O. Thomas, Robert J. Mooney, Nathan J. Cornfeld, Frank L. Neuhauser, Oscar B. Waddell and Joseph B. Forman

[57] ABSTRACT

A microwave diode is packaged solely by contacts and a glass passivant layer adhered to the entire exterior surface of the diode mediate the contacts. The glass layer is of substantially uniform thickness of no less than one mil, exhibits a thermal coefficient of expansion in the range of from 2.6 to 4.8 × $10^{-6}$ in/in/°C and a dielectric constant in the range of from 6 to 18. The glass is in non-wetting association with the contacts.

9 Claims, 1 Drawing Figure

PATENTED MAY 1 1973 3,731,159
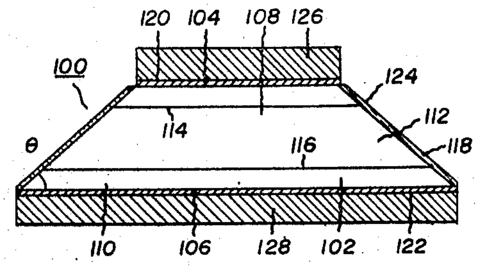
INVENTOR:
JOSEPH A. McCANN,
BY Carl A. Thomas
HIS ATTORNEY

MICROWAVE DIODE WITH LOW CAPACITANCE PACKAGE

This application is a continuation-in-part of my earlier filed application Ser. No. 886,662, filed Dec. 19, 1969, now abandoned.

It is well known to construct solid state rectifiers which include only a glass housing between anode and cathode terminals. In such rectifiers the glass seals to the anode and cathode, but may be either spaced from or sealed to the edge of the semiconductive element forming the active element of the rectifier. The semiconductive element is typically formed with low resistivity regions adjacent the contacts separated by a higher resistivity intervening region. The central region is provided with higher resistivity in order to provide a more graded rectifying junction and hence to increase the blocking voltage capability of the junction. At the same time, however, very high resistivity interveneing layers—that is, layers with resistivities above 500 ohm-cm—are not used, since such high resistivities adversely affect the cost of the semiconductive element, increase the power loss on forward bias, and can contribute to punch through, since the depletion layer would readily sweep through the intervening layer as a result of its extremely low carrier concentration rather than retaining a boundary within the intervening layer as is normally desired.

In considering the use of semiconductor diodes in microwave applications such as phased array radar a very different profile of capabilities is needed than is found in common rectifiers. Microwave diodes are similar to rectifiers in being required to conduct power when forward biased and to withstand substantial terminal applied potential differences when reverse biased. While important, these requirements usually are not stringent by solid state rectifier standards. What is, however, unique to microwave diodes is that they must exhibit a stable, high reactive impedance when biased for the reflection of microwave pulses. This is in direct contrast to ordinary rectifiers where reactive impedances are immaterial to the selective conduction of power. Whereas in the ordinary rectifier variable capacitance is included as a by-product of other functional considerations, in the microwave diode a variable capacitance can result in undesirable signal harmonics. Additionally, a microwave diode must be formed to offer low circuit inductance, a consideration that is non-existent in ordinary rectifier applications.

It is an object of my invention to provide a diode exhibiting a low level of inductance and a substantially stable low level of capacitance capable of reflecting a microwave signal while sustaining a depletion layer thickness approximately corresponding to the thickness of a central very nearly intrinsic layer.

This and other objects of my invention are accomplished in one aspect by providing a diode capable of exhibiting a low level of inductance and a substantially stable low level capacitance while reflecting a microwave pulse and sustaining a depletion layer thickness approximately corresponding to the thickness of a central very nearly intrinsic layer. The diode is comprised of a silicon semiconductive element having first and second opposed major surfaces comprised of a first layer of a first conductivity type adjacent the first major surface and a second layer of an opposite conductivity type adjacent the second major surface. An intervening layer is interposed between the first and second layers having a resistivity exceeding 500 ohm-cm. Means are provided for protectively packagaing the semiconductive element consisting entirely of first and second contact layers directly associated with the first and second major surfaces, respectively, and a glass passivant layer adhered to the entire exterior surface of the semiconductive element mediate the contact layers. The glass passivant layer has a substantially uniform thickness of no less than one mil, a thermal coefficient of expansion in the range of from 2.6 to $4.8 \times 10^{-6}$ in/in°C, and a dielectric constant in the range of from 6 to 18.

My invention may be better understood by reference to the following detailed description considered in conjunction with the drawing, which is a schematic section of a diode constructed according to my invention. The diode is shown substantially enlarged with the thickness of the semi-conductive element being exaggerated for ease of depiction. Sectioning is omitted from the semiconductive element to avoid unduly cluttering the drawing.

My microwave diode 100 shown in the drawing is provided with a silicon semiconductive element 102 which is provided with first and second opposed major surfaces 104 and 106. A first layer 108 of a first conductivity type lies adjacent the first major surface while a second layer 110 of an opposite conductivity type lies adjacent the second major surface. In other words, when the layer 108 is of N conductivity type the layer 110 is of P conductivity type and vice versa. A central region or layer 112 is interposed between the first and second layers. The central layer is very nearly intrinsic. That is, it is very nearly free of impurities of either P or N conductivity type. Since it is impractical if not impossible to form a layer which is theoretically intrinsic, I recognize that the central layer may contain a predominance of either P or N conductivity type impurities. For example, while theoretically intrinsic silicon exhibits a resistivity of 60,000 ohm-cm, the central layer of my microwave diode may exhibit a resistivity as low as 500 ohm-cm, although I prefer a resistivity of at least 1,000 ohm-cm. While this might appear to represent a substantial departure from the theoretical maximum resistivity of intrinsic silicon, it is to be remembered that in conventional PIN rectifiers, the comparable central layer is conventionally labeled intrinsic, even though the resistivity of this layer seldom exceeds 200 ohm-cm. In other words, because of the impracticality of obtaining truly intrinsic silicon, the term "intrinsic" has been loosely applied to lightly doped regions generally. The distinguishing characteristic of my intrinsic central layer is that it exhibits a resistivity which is more than twice that of conventional PIN rectifiers.

In the drawing the boundary between the first and central layers is schematically represented by line 114 while the boundary between the second and central layers is represented by a line 116. In practice the first and second layers are preferably formed by diffusing impurities into the semiconductive element from the major surfaces. The semiconductive element is then initially entirely of the composition of the central region. By diffusing in from the opposite major surfaces, the impurity concentrations will grade progressively downwardly from the major surfaces toward the interior of the semiconductive element. Depending on the net impurity concentration of the central region, one of the boundaries will form a graded junction with the adjacent layer of opposite net impurity type.

As shown the semiconductive element is formed so that the boundary 116 between the second and central layers serves as a junction. An annular beveled peripheral edge is shown to form an included angle theta ($\theta$) with the second major surface and junction. It can then be seen that the semiconductive element is positively beveled—that is, the cross-section of the central layer taken parallel to the junction diminishes in a direction away from the junction while the cross-section of the second layer similarly taken increases away from the junction. As is understood in the art when the angle theta is chosen to be a value of from 12° to 75° a field gradient reducing or spreading effect is in evidence along the peripheral edge 118.

It is universally recognized in the art that semiconductive elements must be packaged in order to protect against moisture and other contaminants. It is a unique feature of my invention that I provide as the entire protective package for my semiconductive element a first contact 120 associated with the first major surface, a second major contact 122 associated with the second major surface, and a glass layer 124 associated with the peripheral surface and extending between the first and second contacts. The contacts are directly attached to the silicon and provide an ohmically conductive bond. Any of a wide variety of contact metals may be utilized including, but not limited to, aluminum, gold, silver, platinum, nickel, tungsten, molybdenum, tantalum, etc. The thicknesses of the contacts are not critical, but may range upwardly in thickness from as low as a 1,000 Angstroms. Typically, however, the contacts are maintained at a thickness of less than about a mil so that undue stress cannot be transmitted to the semiconductive element as a result of differences in thermal coefficients of expansion of the metal and silicon.

The glass layer is directly bonded to the peripheral edge of the semiconductive element. The glass layer exhibits a dielectric constant in the range of from 6 to 18, but preferably no higher than 14 and no less than 7. Since glass is brittle as compared with metals, particularly when placed in tension, it is necessary that the glass exhibit a thermal coefficient of expansion in the range of from 2.6 to 4.8 $\times 10^{-6}$ in/in/°C. This includes glasses which approximate the thermal coefficient of expansion of silicon as well as those that have somewhat higher and slightly lower thermal expansions. To effectively reduce the surface capacitance of the semiconductive element it is necessary that the glass layer exhibit a thickness of at least 5 microns. In order to minimize overall device capacitance it is preferred that the glass layer be maintained thin. However, where the device is to be used in air, it is necessary that the glass exhibit a minimum thickness of approximately one mil to avoid exceeding the dielectric strength of air adjacent the glass surface. In the preferred form the glass may be centrifugally or electrophoretically applied by conventional techniques to form a thin, substantially uniform layer. By reason of affinity for oxides the glass readily wets the silicon, since silicon when exposed to ambient air forms a minute oxide surface layer. It is preferred, however, that the contact metals be chosen so that wetting thereof by the glass does not occur. I have observed this to be an advantage in reducing package capacitance.

Non-wetting of the contact by the glass causes a convex meniscus edge to be formed by the glass layer at the periphery of the contacts which serves to confine the glass in its desired location and which reduces chances for portions of the field exterior of the semiconductive element finding a path between the contacts through the glass layer. Non-wetting of the contacts by the glass can be controlled by regulation of the glass firing temperature, employing noble or refractory metals as contacts, or firing the glass in a reducing atmosphere to reduce surface oxidation of the contacts that can contribute to wetting. While a variety of suitable glass compositions are known to the art, I prefer to utilize zinc borosilicate glasses of the type disclosed in Martin U.S. Pat. No. 3,113,878, issued Dec. 10, 1963, and Graff U.S. Pat. No. 3,441,442, issued Apr. 29, 1969.

In one form of my invention the package and semiconductive element may together form the entire diode. In other applications it may be desirable to attach to each contact a back up plate or other metallic conductor to facilitate circuit mounting of the diode. In the drawing a first back up plate 126 is associated with the first contact while a second back up plate 128 is associated with the second contact. As is well understood in the art back up plates are typically formed of refractory metals having a low thermal coefficient of expansion approaching that of silicon. For example, back up plates formed of Kovar, Fernico, tungsten, and molybdenum are widely employed in the art.

In utilizing the microwave diode 100, when a potential is applied across the contacts so as to reverse bias the junction within the semiconductive element 102, free charge carriers will be swept from the nearly intrinsic central region 112 and no appreciable direct current will flow between the contacts. By forming the central region with a resistivity of at least 500 ohm-cm the depletion layer associated with the junction will have an effective thickness corresponding approximately to that of the central region when the diode is reverse biased to its operating point. At the same time each of the first and second layers adjacent the depletion layer will exhibit a potential level substantially identical to that of the associated contact. To assure that the width of the depletion layer remains very nearly constant, reverse biasing of the contacts is continued to a level well above that necessary to spread to the depletion layer throughout the central region. This additional biasing has little effect on increasing the width of the depletion layer owing to the abundant supply of free charge carriers in the first and second layers. Carriers will not re-enter the central layer even when a microwave signal is impressed on the reverse bias voltage of sufficient amplitude to instantaneously forward bias the diode, since the microwave period is far shorter in duration than the required transit time for carrier re-entry. In this circumstance the semiconductive element exhibits a substantially stable bulk capacitance. The first and second layers function as capacitor plates while the depletion layer provides a relatively constant spacing and a dielectric constant between the plates of 11.7. It is to be noted here that this is in direct contrast to what is encountered in a rectifier, since in a rectifier the central region is provided with a lower resistivity under normal biasing conditions. Accordingly, in an ordinary rectifier a microwave signal superimposed on a d-c reverse bias will result in the diode exhibiting a variable capacitance. This can lead to the generation of signal distortions such as signal harmoncis. In my diode the bulk capacitance remains substantially constant.

In addition to bulk capacitance, semiconductor diodes also exhibit surface capacitance. This is attributable to the fact that surface silicon atoms have unshared valence electrons. In my microwave diode surface capacitance is minimized by bonding the glass layer directly to the peripheral surface of the semiconductive element. The silicon and oxygen atoms contained in the glass partially compensate the unshared electron pairs of the silicon atoms located at the surface of the silicon crystal. This minimizes surface capacitance effects.

In addition to bulk and surface capacitance the ordinary solid state rectifier additionally exhibits package capacitance. In my diode construction the thin layer of glass, which together with the contacts forms the entire package, exhibits an extremely low level of capacitance as compared to ordinary glass and hermetic packages. Further, the lack of wetting between the glass and contacts further reduces package capacitance.

It is then apparent that my microwave diode can be constructed to exhibit a minimal capacitance and a high reactive impedance. To meet a fixed low capacitance criteria my diode may exhibit a diameter to thickness ratio larger than that of conventionally constructed diodes. This means that a low level of inductance is exhibited, since increasing the diameter to thickness ratio decreases the inductance. In microwave diode applications it is, of course, important that the inductance as well as the capacitance be held to a low level. Another benefit that is obtained by increasing the diameter to thickness ratio is that heat may be more easily removed from the device and operating temperatures held to a minimum. Also, micorwave signal input resistance is minimized by increase of the diameter to thickness ratio. This can be of overriding importance in applications such as phased array radar where the microwave signal must be supplied to many thousands of microwave diodes. Reduction of the surface capacitance also acts to increase the cross-sectional area of the semi-conductive element available for current conduction and thereby to reduce the input signal resistance.

The thin glass layer associated with the semiconductive element in addition to reducing surface capacitance and protecting the semiconductive element against moisture and other contaminants also performs the beneficial function of spreading the field at the surface of the semiconductive element to reduce the field gradient. The maximum reduction in field gradient is achieved when the dielectric constant of the glass approximates that of the silicon. By choosing glass to form the package having a dielectric constant in the range of from 6 to 18, preferably in the range of from 7 to 14, I am able to achieve a useful spreading of the field gradient. When the glass exhibits either a higher or lower dielectric constant, the field gradient may even be increased. Because of the field gradient reducing effect of the glass which I employ, it is not essential that the edge of the semiconductive element be beveled. While the use of a glass package and beveling together can have a very beneficial effect on reduction of the field gradient, I have observed that when a glass package is formed according to my teachings a field gradient reducing effect can be achieved which is normally achieved by reliance upon beveling. I have further noted that microwave diodes formed according to my invention are capable of withstanding high levels of terminal applied potential attributable to the field spreading abilities of the glass package even when the bevel angle is chosen to accentuate the surface field gradient.

While I have described my invention with reference to certain preferred embodiments, it is appreciated that numerous variations will readily occur to those skilled in the art. It is accordingly intended that the scope of my invention be determined by reference to the following claims.

What I claim and desire to secure by Letters Patent of the United States is:

1. A diode capable of exhibiting a low level of inductance and a substantially stable low level capacitance while reflecting a microwave pulse comprising a silicon semiconductive element having first and second opposed major surfaces comprised of a first layer of a first conductivity type adjacent said first major surface, a second layer of an opposite conductivity type adjacent said second major surface, and an intervening layer interposed between said first and second layers having a resistivity exceeding 500 ohm-cm, means protectively packaging said semiconductive element consisting entirely of first and second contact layers directly associated with said first and second major surfaces respectively and a glass passivant layer adhered to the entire exterior surface of the semiconductive element mediate said contact layers in non-wetting edge association with at least one of said contact layers so that a convex meniscus edge is formed by said glass layer at the periphery of at least said one contact layer, said glass passivant layer having a substantially uniform thickness of no less than 5 microns, a thermal coefficient of expansion in the range of from 2.6 to $4.8 \times 10^{-6}$ in/in°C, and a dielectric constant in the range of from 6 to 18.

2. A diode according to claim 1 in which said intervening layer exhibits a resistivity exceeding 1,000 ohm-cm.

3. A diode according to claim 1 in which said glass passivant layer exhibits a dielectric constant in the range of from 7 to 14.

4. A diode according to claim 1 in which said glass passivant layer exhibits a dielectric constant which approximates that of intrinsic silicon.

5. A diode according to claim 1 additionally including terminal means associated with said contacts.

6. A diode according to claim 1 additionally including terminal means associated with said contacts which are free of direct association with said glass passivant layer.

7. A diode according to claim 1 in which said semiconductive element is peripherally positively beveled at an acute included angle between its peripheral edge and junction in the range of from 12° to 75°.

8. A diode according to claim 1 in which said glass passivant layer exhibits a thickness of no less than 1 mil.

9. A diode according to claim 1 in which said glass passivant layer lies in non-wetting edge association with both said first and second contact layers so that convex meniscus edges are formed by said glass layer at the periphery of both of said contact layers.

* * * * *

UNITED STATES PATENT AND TRADEMARK OFFICE

CERTIFICATE OF CORRECTION

PATENT NO. : 3,731,159

DATED : May 1, 1973

INVENTOR(S) : Joseph A. McCann

It is certified that error appears in the above-identified patent and that said Letters Patent are hereby corrected as shown below:

On the first page: [73] Assignee should read:

Assignee: General Electric Company,
Syracuse, New York

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*